United States Patent [19]

Ozaki

[11] Patent Number: 4,670,788
[45] Date of Patent: Jun. 2, 1987

[54] GRAY SCALE TRANSFORMATION CIRCUIT

[75] Inventor: Takayuki Ozaki, Hyogo, Japan

[73] Assignee: Kabushiki Kaisha Toshiba, Japan

[21] Appl. No.: 796,203

[22] Filed: Nov. 8, 1985

[30] Foreign Application Priority Data

Nov. 9, 1984 [JP] Japan ............................... 59-236270

[51] Int. Cl.⁴ .................... H04N 5/14; H04N 5/20
[52] U.S. Cl. ................................. 358/164; 358/101; 358/106
[58] Field of Search ............... 358/164, 93, 101, 106; 382/50

[56] References Cited

U.S. PATENT DOCUMENTS 4,394,688  7/1983  Iida ..................................... 358/164
4,513,278  4/1985  Seitz .................................... 358/164
4,589,019  5/1986  Dischert ............................. 358/164

Primary Examiner—Howard W. Britton
Attorney, Agent, or Firm—Finnegan, Henderson, Farabow, Garrett & Dunner

[57] ABSTRACT

A gray scale transformation circuit has a picture memory for storing a set of video data. Each video data represents the gray level of a picture element of IC module picture image. The transformation circuit comprises a register for holding video data read out from the picture memory and a transformation memory including memory locations in which transformation data are preset. The memory locations have addresses as a regular gray scale for the video data. The transformation data preset in the transformation memory is a function of the regular gray scale. One of the memory locations of the transformation memory is selected by the content of the register. Transformation data is read out from the selected memory location to be transferred to an image processing unit.

8 Claims, 9 Drawing Figures

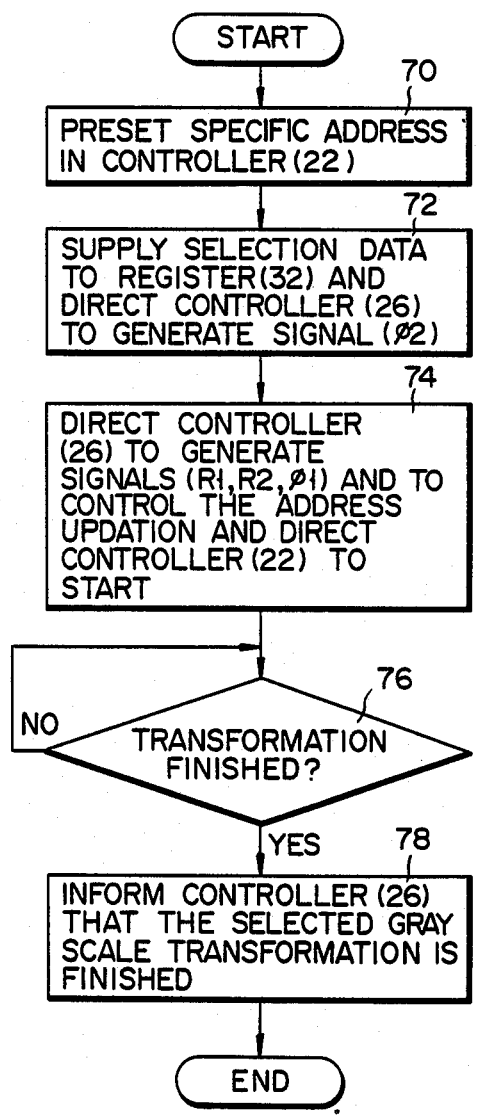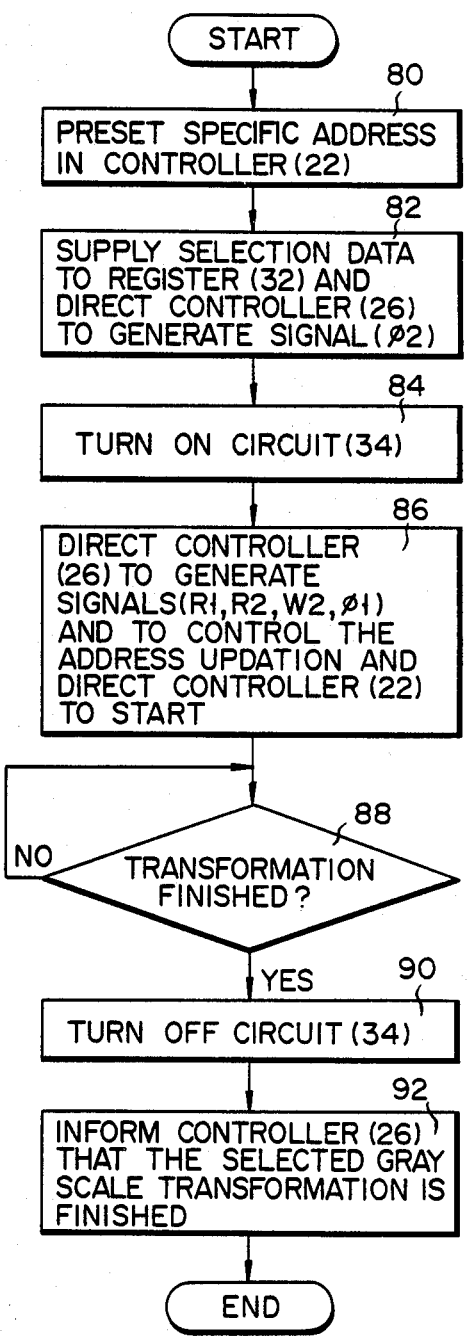

GRAY SCALE TRANSFORMATION CIRCUIT

BACKGROUND OF THE INVENTION

This invention relates to a gray scale transformation circuit and, more particularly, to a gray scale transformation circuit for an image processing unit for recognizing patterns, gray levels, etc.

In recent years, inspections for defects in industrial products have become automated. For example, after a molding process, a picture of the molded IC device is taken by an industrial TV (ITV) camera to inspect the defect of the molded IC device. The picture image is electronically transferred to an image processing unit via an input interface. In the image processing unit, mold defects of the IC device are detected. The input interface receives an analog video signal from the ITV camera and generates a digital data signal (i.e., digital data stream) suitable for defect inspection. In the input interface, an analog-to-digital conversion process is performed, and then a gray scale transformation process is performed. In the preceding process, the analog video signal is quantized at a predetermined time interval to be converted to a plurality of digital data. Each digital data has a predetermined word length of 8 bits for instance. In this case, the digital data represents a gray level of the picture element of the picture image as corresponding to one of 256 different numerical values. In the preceding process, the digital data are successively converted to different values according to a predetermined transformation (function) formula. The predetermined transformation formula is set for each purpose for which the gray scale transformation is performed. The main purposes are to obtain digital data which clearly represents the position of the molded IC device and to obtain digital data clearly showing the difference of the gray level of the surface of the molded IC device.

General-purpose digital computers, digital hardware circuits and analog hardware circuits are well known as means for performing gray scale transformation. The general-purpose digital computer performs a function calculation according to the program sequence for a predetermined gray scale transformation. Unless the program sequence is simple, the gray transformation is time-consuming. The quantization interval of the analog-to-digital conversion should be set to a sufficiently small value to obtain a high image resolution. From this standpoint, a long gray scale transformation period is undesirable. Therefore, general-purpose computers are not suitable for high-speed gray scale transformation. formation.

With digital or analog hardware circuits the gray scale transformation can be performed in a shorter period of time compared with general-purpose computers. This is because there is no need to fetch programs. However, each hardware circuit is designed to have a specific structure corresponding to a specified function. Therefore, where different functions are required for different purposes, it is necessary to prepare a plurality of circuits, and when the functions are of a non-linear type, the circuit structure design becomes very complicated.

Further, where a plurality of ITV cameras are cooperatively utilized in the defect inspection, it is necessary to compensate for such things as the sensitivity difference characteristics between the ITV cameras. In the prior art, a plurality of analog hardware circuits are provided corresponding to the number of ITV cameras to compensate for the difference in sensitivity through the co-operative use of the hardware circuits. Where the gray scale transformation is performed for two different purposes as noted above, it is necessary to provide double the number of the hardware circuits. Consequently, a large number of hardware circuits having different structures have to be designed, which is expensive.

SUMMARY OF THE INVENTION

An object of the invention is to provide a gray scale transformation circuit which has a very high transformation speed and permits ready presetting and alternation of transformation functions.

To attain the above object of the invention, a gray scale transformation circuit is provided which comprises a picture memory for storing a plurality of video data each representing the gray level of each of a plurality of regions constituting a picture, a register connected to the picture memory for holding the video data read out from the picture memory, and a transformation memory, connected to the register to receive the video data as an address signal and including a plurality of memory locations in which transformation data are stored, for supplying transformation data from the memory location selected by the received video data.

BRIEF DESCRIPTION OF THE DRAWINGS

FIGS. 2A to 2D are flow charts for explaining the operation of the SCU 24 shown in FIG. 1;

DETAILED DESCRIPTION OF THE PREFERRED EMBODIMENTS

Figure 1:
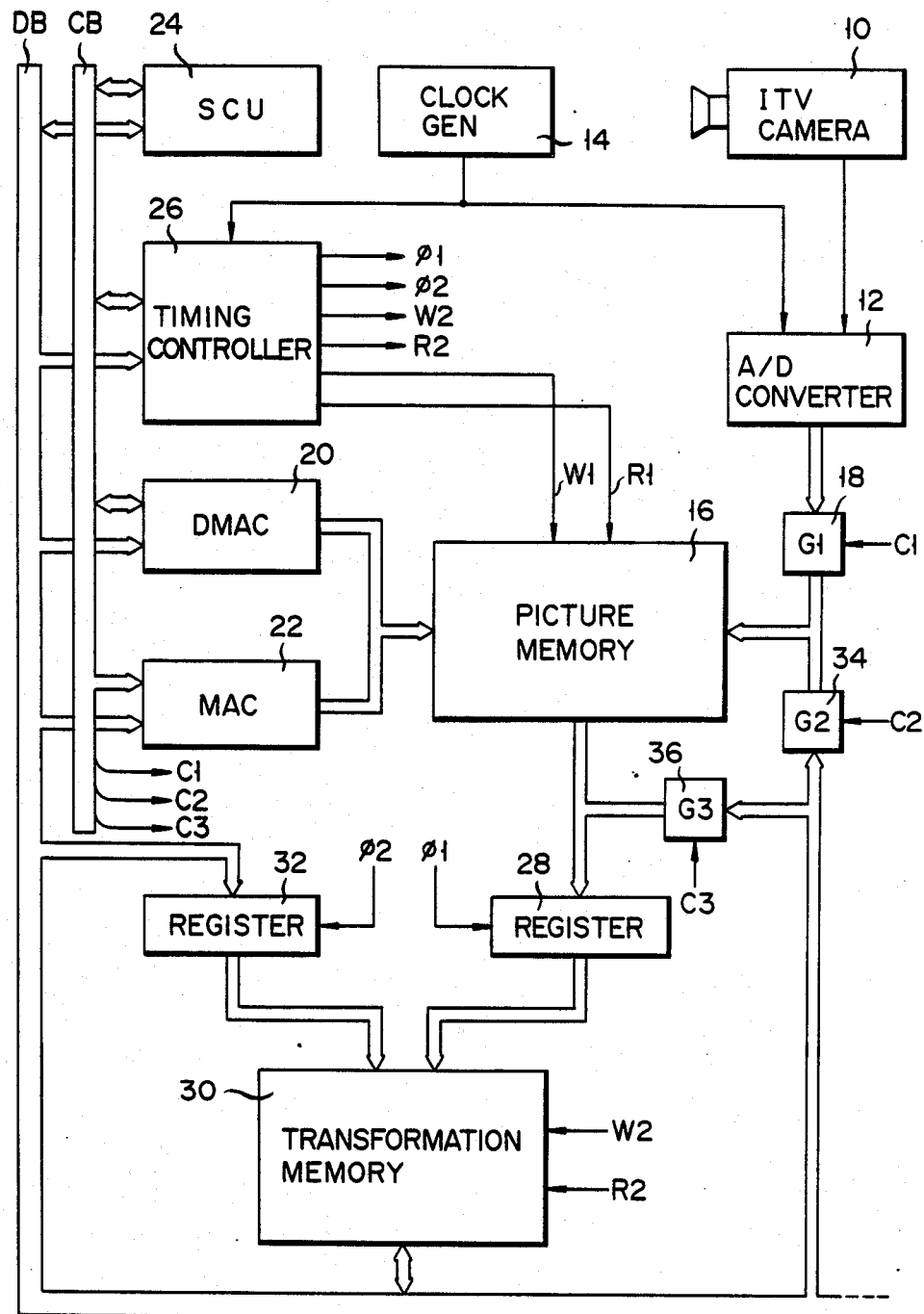
FIG. 1 is a block diagram showing a first embodiment of the gray scale transformation circuit according to the invention.

A first embodiment of the gray scale transformation circuit will now be described with reference to FIGS. 1 and 2A to 2D. FIG. 1 illustrates the structure of the gray scale transformation circuit. Referring to FIG. 1, a ITV camera 10 takes a picture of an IC device (not shown) to be inspected for defects and generates a video signal corresponding to a picture image. The video signal is generated as an analog signal like that of the usual monochromatic television camera. The video signal of the ITV camera 10 is supplied to an analog-to-digital (A/D) converter 12. A clock generator 14 which generates clock pulses at a predetermined interval, is connected to the A/D converter 12. The A/D converter 12 quantizes the analog video signal in response to each clock pulse. A plurality of digital video data are thus generated sequentially from the A/D converter 12. Each video data has a predetermined word length, e.g., of 8 bits. The video data of the A/D converter 12 is supplied to a picture memory 16 through a switching circuit 18. The conduction state of the switching circuit 18 is controlled by control pulses C1. The picture memory 16 has a storage capacity for storing digital data corresponding in number to one frame of image. The picture memory 16 receives address signals from first and second access controllers 20 and 22. The picture memory 16 performs write and read operations specified by a write enable signal W1 and a read enable signal R1, respectively. The received address signal actuates a corresponding memory location of the picture memory 16. The access controller 20 is connected to a sequence control unit (SCU) 24 via a control bus CB for receiving the start command and a signal informing it that the work is over. The access controller 20 is connected to the SCU 24 via a data bus DB to receive address data. The SCU 24 presets initial and last addresses of the picture memory 16 in the access controller 20. The access controller 20 sequentially generates address signals designating all the memory locations of the picture memory 16. The access controller 22 is connected to the SCU 24 via control bus CB and data bus DB for receiving the start command and address data. The SCU 24 presets the address of a specific memory location of the memory 16 in the access controller 22. For example, the initial address of the picture memory 16 is preset. The access controller 22 sequentially generates address signals designating the preset memory location and the memory locations succeeding the preset memory location. The SCU 24 contains first to fourth microprogram routines to be described later and executes the routines selectively in correspondence to an externally specified operation mode. The SCU 24 is connected to the timing controller 26 via control bus CB and data bus DB to supply the start command and mode data. The timing controller 26 generates read enable signals R1 and R2, write enable signals W1 and W2 and latch control signals $\phi 1$ and $\phi 2$ in a predetermined timing corresponding to the operation mode with reference to clock pulses from the clock generator 14. The timing controller 26 is connected to the access controllers 20 and 22 via the control bus CB for controlling the timing of address updating. The picture memory 16 is connected to the register 28 to supply read data. The register 28 holds the received data in response to a latch control signal $\phi 1$. The register 28 is connected to the transfer memory 30 to supply the scale address signal. The transformation memory 30 is connected to the register 32. The register 32 is connected to the SCU 24 via the data bus DB for receiving the selection data. The register 32 holds the selection data in response to the latch control signal $\phi 1$ and supplies the held data to the transformation memory 30 as a block select signal. The transformation memory 30 has memory locations of first to third memory blocks corresponding in number to the different kinds of gray scale transformations. The transformation memory 30 is connected to SCU 24 via data bus DB to receive transformation data. The transformation memory 30 performs read and write operations designated by the read enable signal R2 and write enable signal W2 and actuates a memory location corresponding to the scale address signal and block select signal. The first to third memory blocks are selected by the block select signal. The memory locations of each memory block is selected by the scale address signal. The transformation memory 30 stores a set of transformation data in the memory locations of each memory block before performing a transforming operation for a specific gray scale transformation. More specifically, first to third sets of transformation data are stored in the memory locations of the first to third memory blocks. The transformation data of each set, is a function of the memory location address of the corresponding memory block. The memory location address corresponds to the regular gray scale of the video data. The transformation memory 30 is connected to an external image processing unit (not shown) for supplying read data. It is also connected to the picture memory 16 through the data bus DB and switching circuit 34 for supplying read data. The conduction state of the switching circuit 34 is controlled according to control pulses C2. The register 28 is connected to the SCU 24 through the switching circuit 36 and data bus DB for receiving address data required for writing transformation data into the transformation memory 30. The conduction of the switching circuit 36 is controlled by the control pulses C3. The control pulses C1 to C3 are generated from the SCU 24 and supplied to the switching circuits 18, 34 and 36 via exclusive lines included in the control bus CB. The switching circuits 18, 34 and 36 are normally held non-conductive. Each of the switching circuits 18, 34 and 36 is turned on when a pulse is received and turned off when the next pulse is received.

The gray scale transformation circuit has four different operation modes, i.e., video data input mode, transformation data presetting mode and first and second gray scale transformation modes. One of these modes is specified, for example, by an external computer system (not shown). The external computer system prepares the first, second and third sets of transformation data and specifies the memory block in which each data set should be preset. The SCU 24 is notified by these sets of data in order of priority from the external system via the control and data buses CB and DB. FIGS. 2A to 2D illustrate microprogram routines of the operation modes.

Figure 2A:
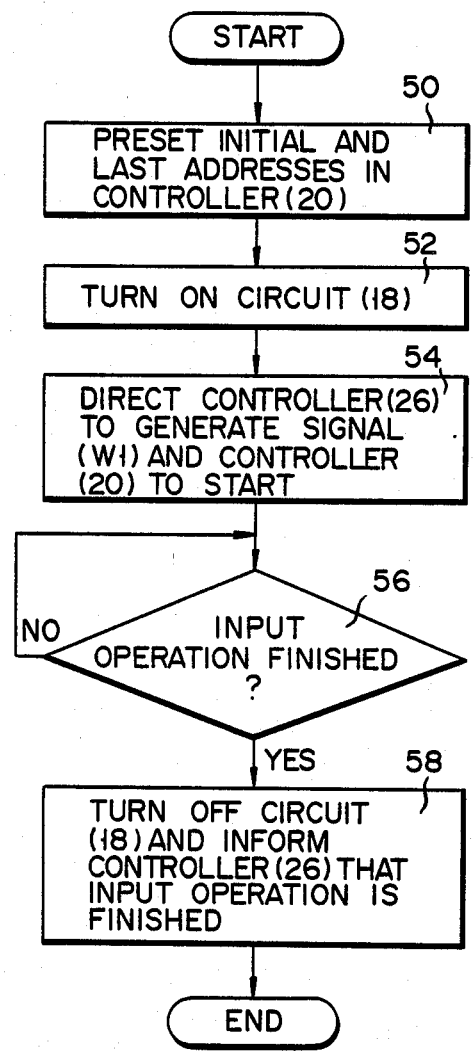

Referring now to FIG. 2A illustrating the video data input mode, the SCU 24 presets initial and last addresses in the access controller 20 in a step 50. In a subsequent step 52, the SCU 24 turns on the switching circuit 18. In a next step 54, the SCU 24 directs the timing controller 26 to generate the write enable signal W1 and also directs the access controller 20 to start operation. In a subsequent step 56, the SCU 24 executes a check as to whether the input operation of the access controller 20 is over. If the result of the check is NO, the step 56 is executed again. If the result is YES, a step 58 is executed in which the SCU 24 turns off the switching circuit 18 and informs the timing controller 26 that the input operation is over.

Figure 2B:
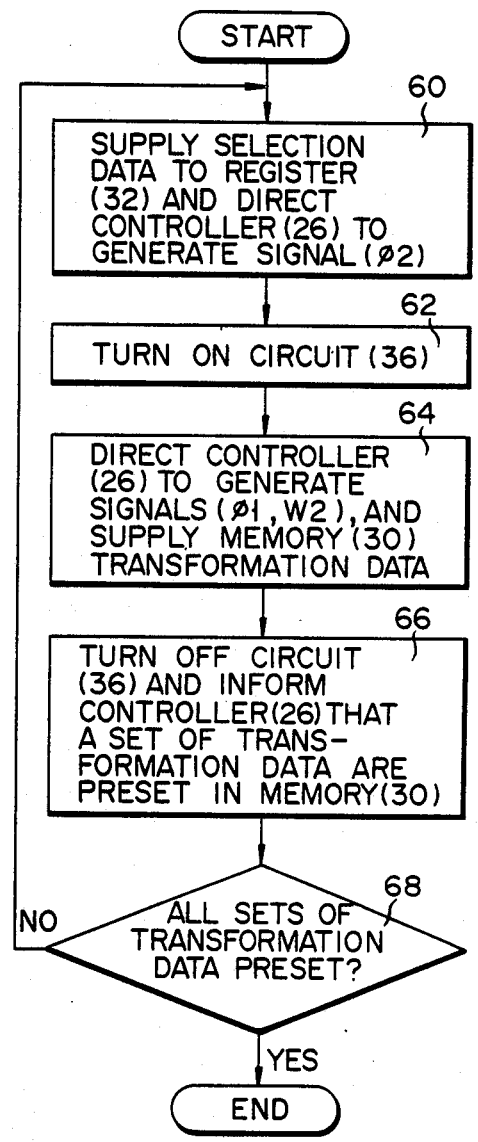

In the transformation data presetting mode shown in FIG. 2B, a step 60 is first executed, in which the SCU 24 supplies selection data to the register 32 and directs the timing controller 26 to generate the control signal $\phi 2$. In a subsequent step 62, the SCU 24 turns on the switching circuit 36. In a next step 64, the SCU 24 directs the timing controller 26 to generate the control signal $\phi 1$ and write enable signal W2. Also, the SCU 24 supplies a predetermined number of successive transformation data for a specific gray scale transformation to the transformation memory 30. In a subsequent step 66, the SCU 24 turns off the switching circuit 36 and informs the timing controller 26 of the fact that a set of transformation data are preset in the memory 30. In subsequent step 68, the SCU 24 makes a check as to whether all data for the first to third gray scale transformations are stored in the memory 30. If the result of the check is NO, the routine goes back to the step 60. If the result of YES, an end is brought to the routine.

In the first gray scale transformation mode shown in FIG. 2C, a step 70 is first executed, in which the SCU 24 presets a specific address in the access controller 22. In a subsequent step 72, the SCU 24 supplies selection data to the register 32 and also directs the timing controller 26 to generate the control signal $\phi 2$. In a next step 74, the SCU 24 directs the timing controller 26 to generate the read enable signals R1 and R2 and control signal $\phi 1$ to control the address updating in the access controller 22. Further, the SCU 24 directs the access controller 22 to start operation. In a subsequent step 76, the SCU 24 makes a check as to whether a predetermined number of transformations have been executed. If the result of the check is NO, the step 76 is executed again. If the result is YES, an end is brought to the routine.

In the second gray scale transformation mode shown in FIG. 2D, a step 80 is first executed, in which the SCU 24 presets a specific address in the access controller 22. In a subsequent step 82, the SCU 24 supplies selection data to the register 32 and also directs the timing controller 26 to generate the control signal $\phi 2$. In a next step 84, the SCU 24 turns on the switching circuit 34. In a subsequent step 86, the SCU 24 directs the timing controller 26 to generate the read enable signals R1 and R2, write enable signal W1 and control signal $\phi 1$ and to control the address updation in the access controller 22. Further, the SCU 24 directs the access controller 22 to start operation. In a subsequent step 88, the SCU 24 makes a check as to whether a predetermined number of transformations are over. If the result of the check is NO, the step 88 is executed again. If the result is YES, a step 90 is executed. In the step 90, the SCU 24 turns off the switching circuit 34.

The operation of the gray scale transformation circuit will now be described.

When the video data input mode is selected, the ITV camera 10 generates an analog video signal corresponding to a picture image. The A/D converter 12 converts the analog video signal into digital video data. The video data from the A/D converter 12 is transferred to the picture memory 16 through the switching circuit 18. The picture memory 16 stores received video data in memory location designated by access controller 20 in response to the write enable signal W1 from the timing controller 26. After the predetermined time period, enough to write an item of video data in the picture memory, has been elapsed, the access controller 20 changes the address signal under the control of the timing controller 26. In this way, video data representing the gray level of the individual picture elements are stored in all the memory locations of the picture memory 16. The stored data in the picture memory 16 constitute one frame of picture image which can be utilized when desired.

When the transformation data presetting mode is selected, the SCU 24 generates selection data designating, for instance, the first memory block. The generated selection data is first supplied from the SCU 24 to the register 32. Then, the timing controller 26 generates the control signal $\phi 2$. The register 32 holds the selection data in response to the control signal $\phi 2$ and supplies the held data to the transformation memory 30. Then, the SCU 24 turns on the switching circuit 36. The SCU 24 further successively generates a first set of transformation data and the address data designating the memory locations in which the generated transformation data must be stored. The timing controller 26 generates the control signal $\phi 1$ and then write enable signal W2 in synchronism to the timing, at which each address data is generated from the SCU 24. The register 28 holds the address data from the SCU 24 in response to the control signal $\phi 1$ and supplies the held address data to the transformation memory 30. After it has completed generating the first set of transformation data, the SCU 24 turns off the switching circuit 36. Through the preset operation described above, the transformation memory 30 obtains a capability of performing a first specific gray scale transformation. The procedure for storing second and third sets of transformation data is the same except that the content of the register 32 is changed to the selection data designating another specific memory block (i.e., the second or third memory block).

When the first gray scale transformation mode is selected, the SCU 24 generates selection data designating, for instance, the first memory block. The generated selection data is supplied from the SCU 24 to the register 32. Then, the timing controller 26 generates the control signal $\phi 2$. The register 32 holds the selection data in response to the control signal $\phi 2$ and supplies the content to the transformation memory 30. Then, the access controller 22 sequentially generates address signals designating a preset address location and the address locations succeeding the preset address location under the control of the timing controller 26. When the first address signal is generated by the access controller 22, the timing controller 26 generates a read enable signal R1. In response to a read enable signal R1, video data is read out from the designated memory location of the picture memory 16 and supplied to the register 28. The timing controller 26 generates the control signal $\phi 1$ after the predetermined time period, enough to read the video data from the picture memory 16, has elapsed. The register 28 holds the received data in response to the control signal $\phi 1$ and supplies the held data to the transformation memory 30. Subsequently, the timing controller 26 requests the access controller 22 to update the address. In response to this request, the access controller 22 generates an address signal designating the memory location next to the accessed memory location. After the address updating, the timing controller 26 generates read enable signals R1 and R2. In response to the read enable signal R2, the transformation memory 30 supplies transformation data, as read data, from the memory location of the address selected by the contents of the registers 28 and 32. The external image processing unit receives the read data from the transformation memory 30 via the data bus DB. The received data is utilized for defect inspection. In response to the succeeding read enable signal R1, the picture memory 16 supplies video data from the memory location selected by the updated address signal to the register 28. As described above, the memory locations of the picture memory 16 are accessed. The operation of the access controller 22 is completed after all the memory locations of the picture memory 16 are accessed. In this case, all the video data in the picture memory 16 are subjected to the first specific gray scale transformation.

When performing the second and third specific gray scale transformations in this mode, this is notified to the SCU 24 by the external computer system (not shown). In consequence, the SCU 24 supplies selection data designating the second or third memory block to the register 32. When the second specific gray scale transformation is selected, the transformation memory 30 reads out the second set of transformation data from the second memory block. On the other hand, when the third specific gray scale transformation is selected, the transformation memory 30 reads out the third set of transformation data from the third memory block.

When the second gray scale transformation mode is selected, the SCU 24 turns on the switching circuit 34 and then supplies selection data designating, for instance, the first memory block to the register 32. Then, the timing controller 26 generates the control signal $\phi 2$. In response to the control signal $\phi 2$, the register 32 holds the selection data and supplies the held data to the transformation memory 30. Subsequently, the access controller 22 sequentially generates address signals designating a preset address location and the address locations succeeding the preset address location under the control of the timing controller 26. When the first address signal is generated by the access controller 22, the timing controller 26 generates a read enable signal R1 after the generation of the address signal designating the initial memory location. In response to the read enable signal R1, the video signal is read out from the the designated memory location of the picture memory 16 and supplied to the register 28. The timing controller 26 generates the control signal $\phi 1$ after the predetermined time period, enough to read the video data from the picture memory 16, has elapsed. In response to the control signal $\phi 1$, the register 28 holds the received data and supplies the held data to the transformation memory 30. Then, the timing controller 26 simultaneously generates the read enable signal R2 and write enable signal W1. In response to the read enable signal R2, transformation data is read out from address locations of the transformation memory 30 according to the data in the registers 28 and 32. The external image processing unit receives read data from the transformation memory 30 through the data bus DB. The received data is utilized for defect inspection. Meanwhile, the picture memory 16 receives read data from the transformation memory 30 through the switching circuit 34 and data bus DB and stores the received data, i.e., received transformation data, in response to the write enable signal W1. Thereafter, the timing controller 26 requests the access controller 22 to update the address. In response to this request, the access controller 22 generates an address signal designating the memory location next to the accessed memory location. After the address updating, the timing controller 26 again generates a read enable signal R1. As described above, the memory locations of the picture memory 16 are accessed. The operation of the access controller 22 is completed, after all the memory locations of the picture memory 16 are accessed. The video data in the picture memory 16 are all subjected to the first specific gray scale transformation during the period that the transformed video data is supplied from the transformation memory to the external image processing unit. The picture memory 16 stores the transformed video data. Thus, the contents of the picture memory 16 can be utilized when displaying the image after the gray scale transformation, for instance.

Figure 3A:
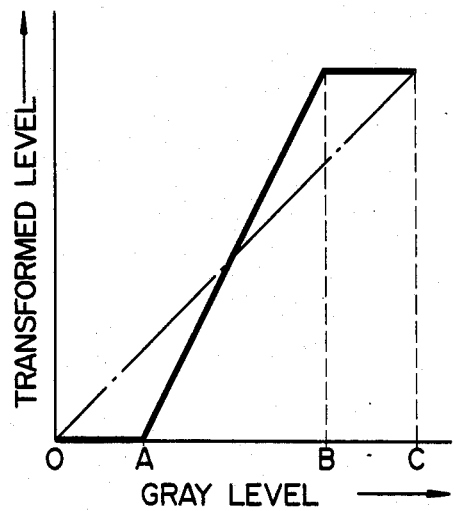
FIGS. 3A to 3C are graphs showing the relation between gray level and transformed level in first to third transformations, respectively.
Figure 3B:
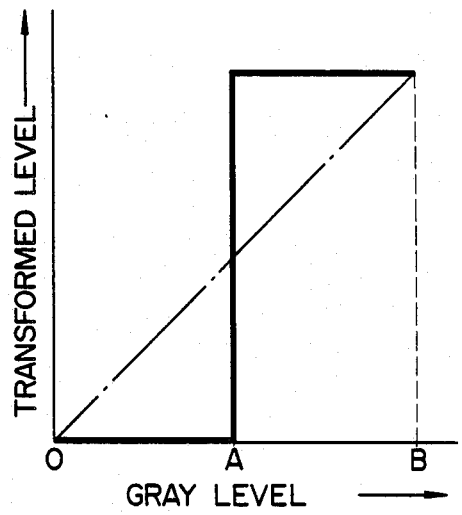
Figure 3C:
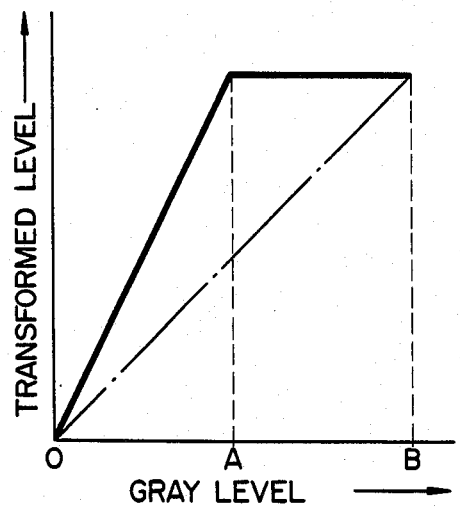

Now, the first to third gray scale transformations will be described with reference to FIGS. 3A to 3C. In this gray scale transformation circuit, the video data represents gray level as a corresponding one of 256 different numerical values. The transformation memory 30 reads out transformation data from one of 256 memory locations in a memory block according to the video data. In FIGS. 3A to 3C, the abscissa represents the gray level of the video data, and the ordinate represents the gray level of the transformation data read out from the transformation memory 30. In each of these Figures, the solid line shows a function representing the relation between a set of transformation data in a memory block and memory location address. The dot-and-barline shows a function representing a linear relation between a set of transformation data in a memory block and memory location address.

FIG. 3A is a graph for the first gray scale transformation which is performed using the transformation data stored in the first memory block of the transformation memory 30. In this transformation, transformation data "0" is stored in memory locations in an address area O-A, while the transformation data "255" is stored in memory locations in an address area B-C. Thus, the video data corresponding to the address area A-B represents the gray level as one of 254 different numerical values "1" to "254". In this transformation, the gray level difference is made clear in the range corresponding to the address area A-B. When the transformed video data is supplied from the gray scale transformation circuit to an image processing unit for defect inspection of the IC device, the image processing unit can detect a defect on the surface of the IC device with a high reliability.

FIG. 3B is a graph for the second gray scale transformation which is performed using the transformation data stored in the second memory block of the transformation memory 30. In this transformation, transformation data "0" is stored in memory locations in an area O-A, while transformation data "255" is stored in memory locations in an address area A-B. Where two different data are stored in respective areas defining a borderline at a location address corresponding to a specific gray level, the image processing unit can detect the position of the IC device through a simple process concerning the brightness and darkness alone.

FIG. 3C is a graph for the third gray scale transformation which is performed using the transformation data stored in the third memory block of the transformation mation memory 30. In this transformation, transformation data "255" is stored in memory locations in an address area A-B. Thus, the video data corresponding to the address area A-B represents the gray level as a corresponding one of 255 different numerical values "0" to "254". In this transformation, the gray level difference is made clear in a range corresponding to the address areas A-B, particularly in a low gray level portion of the area.

The transformation memory 30 of the above embodiment, is formed of a RAM device. However, where the kinds of the gray scale transformations selected in a transformation mode can be specified in advance, a transformation memory formed of a ROM device may be used.

In the above embodiment, the speed of the gray scale transformation is mainly determined by the access time of the transformation memory 30. This access time is very short compared to the calculation period required in the prior art system. The circuit of this embodiment thus performs a high speed gray scale transformation. Further, where a plurality of different gray scale transformations are selectively performed in a transformation mode, a large storage capacity is required for the transformation memory 30. However, since a LSI memory device can be utilized for the transformation memory 30, a compact scale design of the entire gray scale transformation circuit is possible. Also, the structure of the circuit of this embodiment will not be complicated even when a non-linear gray scale transformation, for instance, is performed. Further, in this embodiment the picture memory 16 stores video data of a picture image. Therefore, when performing various gray scale transformations with respect to the image of the same foreground subject, there is no need for repeatedly taking a picture of the subject.

Figure 4:
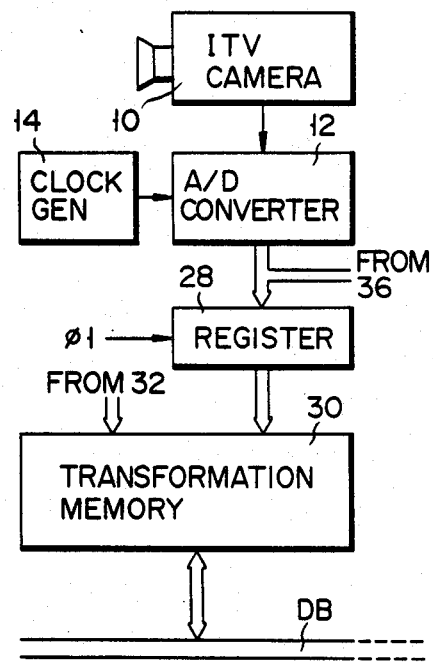
FIG. 4 is a block diagram showing a second embodiment of the gray scale transformation circuit according to the invention, the circuit being similar to the circuit shown in FIG. 1.

FIG. 4 shows a second embodiment of the gray scale transformation circuit. The circuit of this embodiment is the same in structure as the circuit of the preceding first embodiment except for a certain portion. FIG. 4 mainly shows the different portion. More specifically, in this embodiment the video data is supplied to register 28 directly from A/D converter 12. In this case, the video data cannot be utilized repeatedly. However, it is possible to dispense with the picture memory 16 and a circuit for accessing it in the embodiment of FIG. 1.

What is claimed is:

1. A gray scale transformation circuit, for performing a gray scale transformation operation, comprising:
   picture memory means for storing a plurality of video data each representing the gray level of each of a plurality of regions constituting a picture;
   register means connected to said picture memory means for holding video data read out from said picture memory means;
   transformation memory means, connected to said register means to receive the video data as an address signal and including a plurality of memory locations in which transformation data are stored, for supplying transformation data from one of the memory locations selected by the received video data; and
   feedback means for sending the transformation data supplied from said transformation memory means back into said picture memory means in order to perform repeated ones of said gray scale transformation operation.

2. A gray scale transformation circuit according to claim 1, in which said transformation memory includes a plurality of memory blocks each having said memory locations; and which further comprises control means for selecting one of the memory blocks to be accessed.

3. A gray scale transformation circuit according to claim 2, wherein said transformation memory means is formed of a ROM device.

4. A gray scale transformation circuit according to claim 1, further comprising preset means for presetting said transformation data in said transformation memory means.

5. A gray scale transformation circuit according to claim 4, wherein said transformation memory means is formed of a RAM device.

6. A gray scale transformation circuit according to claim 1, further comprising photosensing means for generating said video data and write control means for setting the video data generated from said photosensing means into said picture memory means.

7. A gray scale transformation circuit according to claim 6, in which said transformation memory includes a plurality of memory blocks each having said memory locations; and which further comprises control means for selecting one of the memory blocks to be accessed.

8. A gray scale transformation circuit according to claim 7, further comprising preset means for presetting said transformation data in said transformation memory means.

* * * * *